United States Patent
Tarao et al.

(10) Patent No.: US 10,183,197 B2
(45) Date of Patent: Jan. 22, 2019

(54) GOLF BALL

(71) Applicant: Dunlop Sports Co., Ltd., Kobe-shi, Hyogo (JP)

(72) Inventors: Toshiyuki Tarao, Kobe (JP); Mami Tanaka, Kobe (JP)

(73) Assignee: SUMITOMO RUBBER INDUSTRIES, LTD., Kobe-shi, Hyogo (JP)

( * ) Notice: Subject to any disclaimer, the term of this patent is extended or adjusted under 35 U.S.C. 154(b) by 0 days.

(21) Appl. No.: 15/699,748

(22) Filed: Sep. 8, 2017

(65) Prior Publication Data

US 2018/0093138 A1    Apr. 5, 2018

(30) Foreign Application Priority Data

Sep. 30, 2016 (JP) .................................. 2016-193886

(51) Int. Cl.
| | |
|---|---|
| *A63B 37/02* | (2006.01) |
| *C08L 9/00* | (2006.01) |
| *A63B 37/00* | (2006.01) |
| *C08G 83/00* | (2006.01) |

(52) U.S. Cl.
CPC ........ *A63B 37/0051* (2013.01); *A63B 37/008* (2013.01); *A63B 37/0062* (2013.01); *A63B 37/0063* (2013.01); *A63B 37/0087* (2013.01); *C08G 83/007* (2013.01); *C08L 9/00* (2013.01); *A63B 37/0074* (2013.01)

(58) Field of Classification Search
None
See application file for complete search history.

(56) References Cited

U.S. PATENT DOCUMENTS

| 7,622,527 B2 * | 11/2009 | Ito .......................... B01J 20/26 |
| | | 525/54.4 |
| 2005/0202902 A1 | 9/2005 | Ohama et al. |
| 2009/0143170 A1 | 6/2009 | Ohira et al. |
| 2011/0065529 A1 | 3/2011 | Ohira et al. |

FOREIGN PATENT DOCUMENTS

| JP | 2005-218618 A | | 8/2005 |
| JP | 2008-298682 A | | 2/2008 |
| JP | 2009-131631 A | | 6/2009 |
| JP | 2009-178520 A | | 8/2009 |
| WO | WO 2009031686 | * | 3/2009 |

* cited by examiner

*Primary Examiner* — David J Buttner
(74) *Attorney, Agent, or Firm* — Birch, Stewart, Kolasch & Birch, LLP (57) ABSTRACT

An object of the present invention is to provide a golf ball excellent in durability. The present invention provides a golf ball comprising a constituent member containing a cross-linked rubber component and a polyrotaxane component, wherein the polyrotaxane has a cyclodextrin, a linear molecule piercing through the cyclic structure of the cyclodextrin, and blocking groups located at both terminals of the linear molecule to prevent disassociation of the cyclodextrin, and at least a part of hydroxyl groups of the cyclodextrin is modified with a caprolactone chain via —O—$C_3H_6$—O— group.

15 Claims, 1 Drawing Sheet

GOLF BALL

FIELD OF THE INVENTION

The present invention relates to a golf ball, and more specifically, relates to a technology for improving a core of a golf ball.

DESCRIPTION OF THE RELATED ART

A golf ball comprising a soft core formed from a cured product of a rubber composition has a good shot feeling, but durability thereof is poor. A golf ball comprising a hard core formed from a cured product of a rubber composition has a good durability, but a shot feeling thereof is poor. A golf ball having a good balance in durability and a shot feeling is desirable.

For example, as a technology for improving a shot feeling of a golf ball, Japanese Patent Publications No. 2009-178520 A and No. 2008-29862 A can be exemplified, and as a technology for improving a shot feeling and durability of a golf ball, Japanese Patent Publications No. 2005-218618 A and No. 2009-131631 A can be exemplified.

Japanese Patent Publication No. 2009-178520 A discloses a golf ball comprising a solid core having at least one layer, and a cover having at least one layer and covering the solid core, wherein the solid core includes a layer containing a polybutadiene rubber and a thermally expandable microcapsule in an amount of ranging from 0.1 to 10 parts by weight with respect to 100 parts by weight of the polybutadiene rubber, and the thermally expandable microcapsule which has expanded exists in the layer in a dispersed state and the thermally expandable microcapsule which has contracted by an excessive heating is also included in the layer.

Japanese Patent Publication No. 2008-29862 A discloses a solid golf ball comprising a core and a cover formed on the core, wherein the core is formed from a rubber composition containing 100 parts by weight of (i) a base rubber, 20-45 parts by weight of (ii) a co-crosslinking agent, 0.3-5 parts by weight of (iii) an organic peroxide, 0.05-3 parts by weight of (iv) an organic sulfur compound selected from the group consisting of diphenyl polysulfide having 2 to 4 sulfur atoms, bis(4-methacryloylthiophenyl) sulfide, 4,4'-dibromodiphenyl sulfide and 4,4'-thiodibenzenethiol, and 1-20 parts by weight of (v) tungsten.

Japanese Patent Publication No. 2005-218618 A discloses a solid golf ball comprising at least one layer of a core and at least one layer of a cover formed on the core, wherein the core is formed from a rubber composition containing a base rubber, a co-crosslinking agent, an organic peroxide and an organic sulfur compound, the base rubber contains a polybutadiene synthesized using a rare earth element based catalyst, and the organic sulfur compound contains a polysulfide compound having a bromo group.

Japanese Patent Publication No. 2009-131631 A discloses a method of manufacturing a golf ball comprising a solid core formed from a rubber composition and one or more cover encasing the core, wherein the method includes steps of treating a surface of the core with a solution containing a halogenated isocyanuric acid and/or a metal salt thereof, and covering the treated core with a cover material.

SUMMARY OF THE INVENTION

An object of the present invention is to provide a golf ball having improved durability without substantially lowering a shot feeling.

The present invention provides a golf ball comprising a constituent member containing a crosslinked rubber component and a polyrotaxane component, wherein the polyrotaxane has a cyclodextrin, a linear molecule piercing through the cyclic structure of the cyclodextrin, and blocking groups located at both terminals of the linear molecule to prevent disassociation of the cyclodextrin, and at least a part of hydroxyl groups of the cyclodextrin is modified with a caprolactone chain via —O—$C_3H_6$—O— group. According to the present invention, if a polyrotaxane is comprised in a constituent member formed from a cured product of a rubber composition (i.e. a crosslinked rubber), the durability of the resultant golf ball can be improved without substantially lowering the shot feeling thereof.

According to the present invention, a golf ball having improved durability without substantially lowering a shot feeling, is provided.

DESCRIPTION OF THE PREFERRED EMBODIMENT

The present invention provides a golf ball comprising a constituent member containing a crosslinked rubber component and a polyrotaxane component, wherein the polyrotaxane has a cyclodextrin, a linear molecule piercing through the cyclic structure of the cyclodextrin, and blocking groups located at both terminals of the linear molecule to prevent disassociation of the cyclodextrin, and at least a part of hydroxyl groups of the cyclodextrin is modified with a caprolactone chain via —O—$C_3H_6$—O— group.

The crosslinked rubber component contained in the constituent member of the present invention is a cured product of a rubber composition containing (a) a base rubber. The constituent member of the golf ball according to the present invention is preferably formed from a rubber composition containing (a) a base rubber, (b) an α,β-unsaturated carboxylic acid having 3 to 8 carbon atoms and/or a metal salt thereof as a co-crosslinking agent, (c) a crosslinking initiator, and (d) a polyrotaxane. The constituent member obtained by curing the rubber composition contains a crosslinked rubber component and a polyrotaxane component.

[(a) Base Rubber]

As (a) the base rubber, a natural rubber and/or a synthetic rubber may be used. For example, polybutadiene rubber, natural rubber, polyisoprene rubber, styrene polybutadiene rubber, ethylene-propylene-diene rubber (EPDM), or the like may be used. These rubbers may be used solely, or two or more of these rubbers may be used in combination. Typically preferred of them is a high cis-polybutadiene having a cis-1,4 bond in a proportion of 40 mass % or more, preferably 80 mass % or more, more preferably 90 mass % or more, and even more preferably 95 mass % or more, in view of its superior resilience property.

The high-cis polybutadiene preferably has a 1,2-vinyl bond in a proportion of 2.0 mass % or less, more preferably 1.7 mass % or less, and even more preferably 1.5 mass % or less. If the proportion of the 1,2-vinyl bond is excessively high, the rebound resilience may be lowered.

The high-cis polybutadiene is preferably one synthesized using a rare earth element catalyst. When a neodymium catalyst, which employs a neodymium compound of a lanthanum series rare earth element compound, is used, a polybutadiene rubber having a cis-1,4 bond in a high proportion and a 1,2-vinyl bond in a low proportion is obtained with excellent polymerization activity. Such polybutadiene rubber is particularly preferred.

The high-cis polybutadiene preferably has a Mooney viscosity ($ML_{1+4}$ (100° C.)) of 30 or more, more preferably 32 or more, and even more preferably 35 or more, and preferably has a Mooney viscosity ($ML_{1+4}$ (100° C.)) of 140 or less, more preferably 120 or less, even more preferably 100 or less, and most preferably 55 or less. It is noted that the Mooney viscosity ($ML_{1+4}$ (100° C.)) described in the present invention is a value measured according to JIS K6300 using an L rotor under the conditions of preheating time: 1 minute, rotor revolution time: 4 minutes, and temperature: 100° C.

The high-cis polybutadiene preferably has a molecular weight distribution Mw/Mn (Mw: weight average molecular weight, Mn: number average molecular weight) of 2.0 or more, more preferably 2.2 or more, even more preferably 2.4 or more, and most preferably 2.6 or more, and preferably has a molecular weight distribution Mw/Mn of 6.0 or less, more preferably 5.0 or less, even more preferably 4.0 or less, and most preferably 3.0 or less. If the molecular weight distribution (Mw/Mn) of the high-cis polybutadiene is excessively low, processability may deteriorate, and if the molecular weight distribution (Mw/Mn) of the high-cis polybutadiene is excessively high, the rebound resilience may be lowered. It is noted that the molecular weight distribution is measured by gel permeation chromatography ("HLC-8120GPC" available from Tosoh Corporation) using a differential refractometer as a detector under the conditions of column: GMHHXL (available from Tosoh Corporation), column temperature: 40° C., and mobile phase: tetrahydrofuran, and is a value calculated by converting based on polystyrene standard.

[(b) Co-Crosslinking Agent]

(b) The α,β-unsaturated carboxylic acid having 3 to 8 carbon atoms and/or the metal salt thereof is blended into the rubber composition as a co-crosslinking agent, and has an action of crosslinking a rubber molecule by graft polymerization to a base rubber molecular chain. In the case that the rubber composition used in the present invention contains only the α,β-unsaturated carboxylic acid having 3 to 8 carbon atoms as the co-crosslinking agent, the rubber composition preferably further contains (f) a metal compound. By neutralizing the α,β-unsaturated carboxylic acid having 3 to 8 carbon atoms with the metal compound in the rubber composition, essentially the same effect as the case where the metal salt of the α,β-unsaturated carboxylic acid having 3 to 8 carbon atoms is used as the co-crosslinking agent, is obtained. It is noted that in the case that the α,β-unsaturated carboxylic acid having 3 to 8 carbon atoms and the metal salt thereof are used in combination as the co-crosslinking agent, (f) the metal compound may be used as an optional component.

Examples of the α,β-unsaturated carboxylic acid having 3 to 8 carbon atoms include acrylic acid, methacrylic acid, fumaric acid, maleic acid, crotonic acid, and the like.

Examples of the metal constituting the metal salt of the α,β-unsaturated carboxylic acid having 3 to 8 carbon atoms include: a monovalent metal ion such as sodium, potassium, lithium or the like; a divalent metal ion such as magnesium, calcium, zinc, barium, cadmium or the like; a trivalent metal ion such as aluminum or the like, and other metal ion such as tin, zirconium or the like. The above metal ion may be used solely or as a mixture of at least two of them. Among these metal ions, the divalent metal ion such as magnesium, calcium, zinc, barium, cadmium or the like is preferable. Use of the divalent metal salt of the α,β-unsaturated carboxylic acid having 3 to 8 carbon atoms easily generates a metal crosslinking between the rubber molecules. Especially, as the divalent metal salt, zinc acrylate is preferable, because it enhances the rebound resilience of the resultant golf ball. It is noted that the α,β-unsaturated carboxylic acid having 3 to 8 carbon atoms and/or the metal salt thereof may be used solely or as a mixture of at least two of them.

The amount of (b) the α,β-unsaturated carboxylic acid having 3 to 8 carbon atoms and/or the metal salt thereof is preferably 15 parts by mass or more, more preferably 20 parts by mass or more, and even more preferably 25 parts by mass or more, and is preferably 50 parts by mass or less, more preferably 45 parts by mass or less, and even more preferably 35 parts by mass or less, with respect to 100 parts by mass of (a) the base rubber. If the amount of (b) the α,β-unsaturated carboxylic acid having 3 to 8 carbon atoms and/or the metal salt thereof is less than 15 parts by mass, the amount of (c) the crosslinking initiator which will be described later must be increased in order to obtain the appropriate hardness of the constituting member formed from the rubber composition, which tends to cause the lower rebound resilience of the golf ball. On the other hand, if the amount of (b) the α,β-unsaturated carboxylic acid having 3 to 8 carbon atoms and/or the metal salt thereof is more than 50 parts by mass, the constituting member formed from the rubber composition becomes excessively hard, which tends to cause the lower shot feeling of the golf ball.

[(c) Crosslinking Initiator]

(c) The crosslinking initiator is blended to crosslink (a) the base rubber component. As (c) the crosslinking initiator, an organic peroxide is suitable. Specific examples of the organic peroxide include dicumyl peroxide, 1,1-bis(t-butylperoxy)-3,3,5-trimethylcyclohexane, 2,5-dimethyl-2,5-di (t-butylperoxy)hexane, di-t-butyl peroxide, and the like. These organic peroxides may be used solely, or two or more of these organic peroxides may be used in combination. Among them, dicumyl peroxide is preferably used.

The amount of (c) the crosslinking initiator is preferably 0.2 part by mass or more, more preferably 0.5 part by mass or more, and even more preferably 0.7 part by mass or more, and is preferably 5.0 parts by mass or less, more preferably 2.5 parts by mass or less, and even more preferably 2.0 parts by mass or less, with respect to 100 parts by mass of (a) the base rubber. If the amount of (c) the crosslinking initiator is less than 0.2 part by mass, the constituting member formed from the rubber composition becomes so soft that the golf ball may have the lower rebound resilience. If the amount of (c) the crosslinking initiator is more than 5.0 parts by mass, the amount of (b) the co-crosslinking agent which has been described above must be decreased in order to obtain the appropriate hardness of the constituting member formed from the rubber composition, resulting in the insufficient rebound resilience or poor durability of the golf ball.

[(d) Polyrotaxane]

(d) The polyrotaxane has a cyclodextrin, a linear molecule piercing through the cyclic structure of the cyclodextrin, and blocking groups located at both terminals of the linear molecule to prevent disassociation of the cyclodextrin. The polyrotaxane is viscoelastic, since the cyclodextrin molecule is movable along the linear molecule that penetrates the cyclodextrin in a skewerring manner (pulley effect). Even if a tension is applied to the polyrotaxane, the tension can be uniformly dispersed due to the pulley effect.

The cyclodextrin is a general term for an oligosaccharide having a cyclic structure. The cyclodextrin is, for example, a molecule having 6 to 8 D-glucopyranose residues being linked in a cyclic shape via an α-1,4-glucoside bond. Examples of the cyclodextrin include α-cyclodextrin (number of glucose units: 6), β-cyclodextrin (number of glucose units: 7), and γ-cyclodextrin (number of glucose units: 8), and the α-cyclodextrin is preferable. As the cyclodextrin, one type may be used solely, and two or more types may be used in combination.

The linear molecule is not particularly limited, as long as it is a linear molecule capable of piercing through the cyclic structure of the cyclodextrin so that the cyclic structure of the cyclodextrin is rotatable around the linear molecule. Examples of the linear molecule include polyalkylene, polyester, polyether, and polyacrylic acid. Among them, polyether is preferable, and polyethylene glycol is particularly preferable. Polyethylene glycol has less steric hindrance, and thus can easily pierce through the cyclic structure of the cyclodextrin.

The weight average molecular weight of the linear molecule is preferably 5,000 or more, more preferably 6,000 or more, and is preferably 100,000 or less, more preferably 80,000 or less.

The linear molecule preferably has a functional group at both terminals thereof. If the linear molecule has the functional group, the linear molecule can easily react with the blocking group. Examples of the functional group include a hydroxyl group, carboxyl group, amino group, and thiol group.

The blocking group is not particularly limited, as long as it is located at both terminals of the linear molecule and is capable of preventing the cyclodextrin from disassociating from the linear molecule. Examples of the method for preventing the disassociation include a method of using a bulky blocking group to physically prevent the disassociation, and a method of using an ionic blocking group to electrostatically prevent the disassociation. Examples of the bulky blocking group include a cyclodextrin and an adamantyl group. The number of the cyclodextrins which the linear molecule pierces through (the piercing amount) preferably ranges from 0.06 to 0.61, more preferably ranges from 0.11 to 0.48, and even more preferably ranges from 0.24 to 0.41, if the maximum piercing amount is deemed as 1. This is because if the piercing amount is less than 0.06, the pulley effect may not be exerted, and if the piercing amount is more than 0.61, the cyclodextrins are very densely located, so that the movability of the cyclodextrin may decrease.

As the polyrotaxane used in the present invention, a polyrotaxane having at least a part of hydroxyl groups of the cyclodextrin being modified with a caprolactone chain, is preferred. Modifying with the caprolactone chain enhances the compatibility of the polyrotaxane with the rubber component. Further, modifying with the caprolactone chain enhances the flexibility of the polyrotaxane, thereby enhancing the spin performance of the golf ball on approach shot.

As the above modification, for example, the hydroxyl groups of the cyclodextrin are treated with propylene oxide to hydroxylpropylate the cyclodextrin, and then ε-caprolactone is added to perform ring-opening polymerization. As a result of this modification, the caprolactone chain —(CO(CH$_2$)$_5$O)nH (n is a natural number of 1 to 100) is linked to the exterior side of the cyclic structure of the cyclodextrin via —O—C$_3$H$_6$—O— group. The "n" represents the degree of polymerization, and is preferably a natural number of 1 to 100, more preferably a natural number of 2 to 70, and even more preferably a natural number of 3 to 40. At the other terminal of the caprolactone chain, a hydroxyl group is formed through the ring-opening polymerization.

The ratio of the hydroxyl groups modified with the caprolactone chain to all the hydroxyl groups (100 mole %) included in the cyclodextrin before the modification is preferably 2 mole % or more, more preferably 5 mole % or more, and even more preferably 10 mole % or more, and is preferably 60 mole % or less, more preferably 55 mole % or less, and even more preferably 50 mole % or less.

The other terminal of the caprolactone chain generally has a hydroxyl group. It is also preferred that an acrylic group or methacrylic group is introduced at the other terminal of the caprolactone chain. The acrylic group or methacrylic group at the terminal of the caprolactone chain reacts with the double bond of the base rubber and the co-crosslinking agent. As a result, the durability of the obtained golf ball is further enhanced.

The amount of the double bond of the polyrotaxane in which the terminal of the caprolactone chain is modified with the acrylic group or methacrylic group is preferably 0.65 mmol/g or more, more preferably 0.8 mmol/g or more, and even more preferably 1.0 mmol/g or more, and is preferably 2.0 mmol/g or less, more preferably 1.9 mmol/g or less, and even more preferably 1.8 mmol/g or less. If the amount of the double bond falls within the above range, the acrylic group or methacrylic group easily reacts with the base rubber or co-crosslinking agent.

Figure 1:
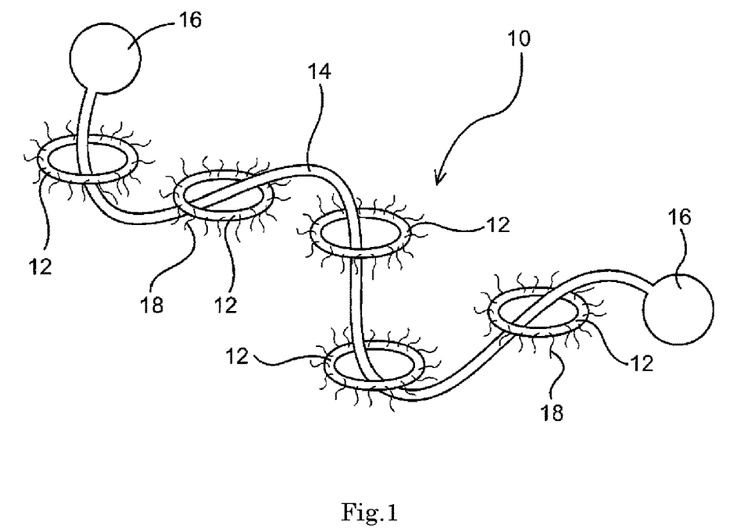
FIG. 1 is an explanatory drawing illustrating a molecular structure of an example of a polyrotaxane used in the present invention.

FIG. 1 is an explanatory drawing showing an example of a molecular structure of a polyrotaxane used in the present invention. The polyrotaxane 10 has a cyclodextrin 12, a linear molecule 14 piercing through the cyclic structure of the cyclodextrin 12, and blocking groups 16 located at both terminals of the linear molecule 14 to prevent disassociation of the cyclic structure of the cyclodextrin 12, and a caprolactone chain 18 is linked to the exterior side of the cyclic structure of the cyclodextrin 12 via —O—C$_3$H$_6$—O— group (not shown).

The hydroxyl value of the polyrotaxane is preferably 10 mg KOH/g or more, more preferably 15 mg KOH/g or more, and even more preferably 20 mg KOH/g or more, and is preferably 400 mg KOH/g or less, more preferably 300 mg KOH/g or less, even more preferably 220 mg KOH/g or less, and most preferably 180 mg KOH/g or less. It is noted that the hydroxyl value may be measured according to JIS K 1557-1, for example, by an acetylation method.

The total molecular weight of the polyrotaxane is preferably 30,000 or more, more preferably 40,000 or more, and even more preferably 50,000 or more, and is preferably 3,000,000 or less, more preferably 2,500,000 or less, and even more preferably 2,000,000 or less, in a weight average molecular weight. If the weight average molecular weight is 30,000 or more, the durability becomes better, and if the weight average molecular weight is 3,000,000 or less, the shot feeling becomes better. It is noted that the weight average molecular weight may be measured, for example, by gel permeation chromatography (GPC) using polystyrene as a standard substance, tetrahydrofuran as an eluant, and an organic solvent system GPC column (e.g., "Shodex (registered trademark) KF series" available from Showa Denko K.K.) as a column.

The amount of (d) the polyrotaxane contained in the rubber composition is preferably 1 part by mass or more, more preferably 2 parts by mass or more, and even more preferably 3 parts by mass or more, and is preferably 30 parts by mass or less, more preferably 27.5 parts by mass or less, and even more preferably 25 parts by mass or less, with respect to 100 parts by mass of (a) the base rubber.

Specific examples of the polyrotaxane modified with the polycaprolactone chain include SeRM (registered trademark) super polymer SH3400P, SH2400P, and SH1310P available from Advanced Softmaterials Inc, and specific examples of the polyrotaxane in which the terminal of the polycaprolactone chain is modified with the acrylic group or methacrylic group include SA3400C and SM3400C.

[(f) Metal Compound]

The rubber composition used in the present invention preferably further contains (f) a metal compound when the rubber composition contains only the α,β-unsaturated carboxylic acid having 3 to 8 carbon atoms as the co-cross-linking agent. (f) The metal compound is not particularly limited, as long as it can neutralize (b) the α,β-unsaturated carboxylic acid having 3 to 8 carbon atoms in the rubber composition. (f) The metal compound includes, for example, a metal hydroxide such as magnesium hydroxide, zinc hydroxide, calcium hydroxide, sodium hydroxide, lithium hydroxide, potassium hydroxide, copper hydroxide, or the like; a metal oxide such as magnesium oxide, calcium oxide, zinc oxide, copper oxide, or the like; and a metal carbonate such as magnesium carbonate, zinc carbonate, calcium carbonate, sodium carbonate, lithium carbonate, potassium carbonate, or the like. (f) The metal compound is preferably a divalent metal compound, and more preferably a zinc compound. The divalent metal compound reacts with the α,β-unsaturated carboxylic acid having 3 to 8 carbon atoms, thereby forming a metal crosslinking. In addition, use of the zinc compound provides a golf ball with high rebound resilience. (f) The metal compound may be used solely or as a mixture of at least two of them.

[(g) Organic Sulfur Compound]

The rubber composition used in the present invention preferably further contains (g) an organic sulfur compound. If the rubber composition contains (g) the organic sulfur compound, the spherical core has a better rebound resilience.

(g) The organic sulfur compound is not particularly limited, as long as it is an organic compound having a sulfur atom in the molecule thereof. Examples thereof include an organic compound having a thiol group (—SH) or a polysulfide bond having 2 to 4 sulfur atoms (—S—S—, —S—S—S—, or —S—S—S—S—), and a metal salt thereof (—SM, —S-M-S—, —S-M-S—S—, —S—S-M-S—S—, —S-M-S—S—S—, or the like; M is a metal atom). Examples of the metal salt include a monovalent metal salt such as sodium, lithium, potassium, copper (I), and silver (I) or the like, and a divalent metal salt such as zinc, magnesium, calcium, strontium, barium, titanium (II), manganese (II), iron (II), cobalt (II), nickel (II), zirconium (II), tin (II) or the like. Furthermore, (g) the organic sulfur compound may be any one of an aliphatic compound (aliphatic thiol, aliphatic thiocarboxylic acid, aliphatic dithiocarboxylic acid, aliphatic polysulfide, or the like), heterocyclic compound, alicyclic compound (alicyclic thiol, alicyclic thiocarboxylic acid, alicyclic dithiocarboxylic acid, alicyclic polysulfide, or the like), and aromatic compound.

As (g) the organic sulfur compound, a compound belonging to thiols (thiophenols and thionaphthols), polysulfides, thiurams, thiocarboxylic acids, dithiocarboxylic acids, sulfenamides, dithiocarbamates, thiazoles or the like may be exemplified.

Examples of the thiols include thiophenols and thionaphthols. The thiophenols include, for example, thiophenol; thiophenols substituted with a fluoro group, such as 4-fluorothiophenol, 2,4-difluorothiophenol, 2,5-difluorothiophenol, 2,6-difluorothiophenol, 2,4,5-trifluorothiophenol, 2,4,5,6-tetrafluorothiophenol, pentafluorothiophenol and the like; thiophenols substituted with a chloro group, such as 2-chlorothiophenol, 4-chlorothiophenol, 2,4-dichlorothiophenol, 2,5-dichlorothiophenol, 2,6-dichlorothiophenol, 2,4,5-trichlorothiophenol, tetrachlorothiophenol, pentachlorothiophenol and the like; thiophenols substituted with a bromo group, such as 4-bromothiophenol, 2,4-dibromothiophenol, 2,5-dibromothiophenol, 2,6-dibromothiophenol, 2,4,5-tribromothiophenol, 2,4,5,6-tetrabromothiophenol, pentabromothiophenol and the like; thiophenols substituted with an iodo group, such as 4-iodothiophenol, 2,4-diiodothiophenol, 2,5-diiodothiophenol, 2,6-diiodothiophenol, 2,4,5-triiodothiophenol, 2,4,5,6-tetraiodothiophenol, pentaiodothiophenol and the like; and a metal salt thereof. As the metal salt, a zinc salt is preferred.

Examples of the thionaphthols (naphthalenethiols) include 2-thionaphthol, 1-thionaphthol, 1-chloro-2-thionaphthol, 2-chloro-1-thionaphthol, 1-bromo-2-thionaphthol, 2-bromo-1-thionaphthol, 1-fluoro-2-thionaphthol, 2-fluoro-1-thionaphthol, 1-cyano-2-thionaphthol, 2-cyano-1-thionaphthol, 1-acetyl-2-thionaphthol, 2-acetyl-1-thionaphthol, and a metal salt thereof. Preferable examples include 2-thionaphthol, 1-thionaphthol, and a metal salt thereof. The metal salt is preferably a divalent metal salt, and more preferably a zinc salt. Specific examples of the metal salt include, for example, the zinc salt of 1-thionaphthol and the zinc salt of 2-thionaphthol.

The polysulfides are organic sulfur compounds having a polysulfide bond, and include, for example, disulfides, trisulfides, and tetrasulfides. The polysulfides are preferably diphenylpolysulfides.

Examples of the diphenylpolysulfides include: diphenyldisulfide; diphenyldisulfides substituted with a halogen group, such as bis(4-fluorophenyl) disulfide, bis(2,5-difluorophenyl) disulfide, bis(2,6-difluorophenyl) disulfide, bis(2,4,5-trifluorophenyl) disulfide, bis(2,4,5,6-tetrafluorophenyl) disulfide, bis(pentafluorophenyl) disulfide, bis(4-chlorophenyl) disulfide, bis(2,5-dichlorophenyl) disulfide, bis(2,6-dichlorophenyl) disulfide, bis(2,4,5-trichlorophenyl) disulfide, bis(2,4,5,6-tetrachlorophenyl) disulfide, bis(pentachlorophenyl) disulfide, bis(4-bromophenyl) disulfide, bis(2,5-dibromophenyl) disulfide, bis(2,6-dibromophenyl) disulfide, bis(2,4,5-tribromophenyl) disulfide, bis(2,4,5,6-tetrabromophenyl) disulfide, bis(pentabromophenyl) disulfide, bis(4-iodophenyl) disulfide, bis(2,5-diiodophenyl) disulfide, bis(2,6-diiodophenyl) disulfide, bis(2,4,5-triiodophenyl) disulfide, bis(2,4,5,6-tetraiodophenyl) disulfide, bis(pentaiodophenyl) disulfide; diphenyldisulfides substituted with an alkyl group, such as bis(4-methylphenyl) disulfide, bis(2,4,5-trimethylphenyl) disulfide, bis(pentamethylphenyl) disulfide, bis(4-t-butylphenyl) disulfide, bis(2,4,5-tri-t-butylphenyl) disulfide, bis(penta-t-butylphenyl) disulfide; and the like.

The thiurams include, for example, thiuram monosulfides such as tetramethylthiuram monosulfide; thiuram disulfides such as tetramethylthiuram disulfide, tetraethylthiuram disulfide, tetrabutylthiuram disulfide; and thiuram tetrasulfides such as dipentamethylenethiuram tetrasulfide. The thiocarboxylic acids include, for example, a naphthalene thiocarboxylic acid. The dithiocarboxylic acids include, for example, a naphthalene dithiocarboxylic acid. The sulfenamides include, for example, N-cyclohexyl-2-benzothiazole sulfenamide, N-oxydiethylene-2-benzothiazole sulfenamide, and N-t-butyl-2-benzothiazole sulfenamide.

(g) The organic sulfur compound preferably includes thiophenols and/or the metal salts thereof, thionaphthols and/or the metal salts thereof, diphenyldisulfides and thiuram disulfides, and more preferably 2,4-dichlorothiophenol, 2,6-difluorothiophenol, 2,6-dichlorothiophenol, 2,6-dibromothiophenol, 2,6-diiodothiophenol, 2,4,5-trichlorothiophenol, pentachlorothiophenol, 1-thionaphthol, 2-thionaphthol, diphenyldisulfide, bis(2,6-difluorophenyl) disulfide, bis(2,6-dichlorophenyl) disulfide, bis(2,6-dibromophenyl) disulfide, bis(2,6-diiodophenyl) disulfide, and bis(pentabromophenyl) disulfide.

(g) The organic sulfur compound may be used solely or as a mixture of at least two of them.

The amount of (g) the organic sulfur compound is preferably 0.05 part by mass or more, more preferably 0.1 part by mass or more, and even more preferably 0.2 part by mass or more, and is preferably 5.0 parts by mass or less, more preferably 3.0 parts by mass or less, and even more preferably 2.0 parts by mass or less, with respect to 100 parts by mass of (a) the base rubber. If the amount of (g) the organic sulfur compound is less than 0.05 part by mass, the effect of adding (g) the organic sulfur compound cannot be obtained and thus the rebound resilience of the golf ball may not be enhanced. If the amount of (g) the organic sulfur compound exceeds 5.0 parts by mass, the compression deformation amount of the obtained golf ball becomes large and thus the rebound resilience may be lowered.

The rubber composition used in the present invention may include an additive such as a pigment, a filler for adjusting weight or the like, an antioxidant, a peptizing agent, and a softener where necessary. Examples of the pigment blended in the rubber composition include a white pigment, a blue pigment, and a purple pigment.

As the white pigment, titanium oxide is preferably used. The type of titanium oxide is not particularly limited, but rutile type is preferred because of its high opacity. The amount of titanium oxide is preferably 0.5 part by mass or more, more preferably 2 parts by mass or more, and is preferably 8 parts by mass or less, more preferably 5 parts by mass or less, with respect to 100 parts by mass of (a) the base rubber.

It is also preferred that the rubber composition contains both a white pigment and a blue pigment. The blue pigment is blended in order to cause white color to be vivid, and examples thereof include ultramarine blue, cobalt blue, and phthalocyanine blue. Examples of the purple pigment include anthraquinone violet, dioxazine violet, and methyl violet.

The amount of the blue pigment is preferably 0.001 part by mass or more, more preferably 0.05 part by mass or more, and is preferably 0.2 part by mass or less, more preferably 0.1 part by mass or less, with respect to 100 parts by mass of (a) the base rubber. If the amount of the blue pigment is less than 0.001 part by mass, blueness is insufficient, and the color looks yellowish. If the amount of the blue pigment exceeds 0.2 part by mass, blueness is excessively strong, and a vivid white appearance is not provided.

The filler blended in the rubber composition is mainly used as a weight adjusting agent for adjusting the weight of the golf ball obtained as a final product. The filler may be blended where necessary. The filler includes, for example, an inorganic filler such as zinc oxide, barium sulfate, calcium carbonate, magnesium oxide, tungsten powder, molybdenum powder, or the like. Zinc oxide is preferred as the filler. It is considered that zinc oxide functions as a vulcanization activator and increases the hardness of the entire core. The amount of the filler is preferably 0.5 part by mass or more, more preferably 1 part by mass or more, and is preferably 30 parts by mass or less, more preferably 25 parts by mass or less, even more preferably 20 parts by mass or less, with respect to 100 parts by mass of the base rubber. If the amount of the filler is less than 0.5 part by mass, it is difficult to adjust the weight, while if the amount of the filler exceeds 30 parts by mass, the mass ratio of the rubber component is reduced and thus the rebound resilience tends to be lowered.

The amount of the antioxidant is preferably 0.1 part by mass or more and 1 part by mass or less with respect to 100 parts by mass of (a) the base rubber, and the amount of the peptizing agent is preferably 0.1 part by mass or more and 5 parts by mass or less with respect to 100 parts by mass of (a) the base rubber.

The constituent member of the golf ball according to the present invention can be formed by molding the kneaded rubber composition in a mold. The molding temperature is preferably 120° C. or more, more preferably 150° C. or more, even more preferably 160° C. or more, and is preferably 170° C. or less. If the molding temperature exceeds 170° C., the hardness of the constituent member tends to be lowered. In addition, the molding pressure preferably ranges from 2.9 MPa to 11.8 MPa, and the molding time preferably ranges from 10 minutes to 60 minutes.

[Golf Ball]

The golf ball according to the present invention is not particularly limited, as long as it is a golf ball comprising a constituent member containing the crosslinked rubber component and the polyrotaxane component. The golf ball according to the present invention includes a one-piece golf ball, two-piece golf ball, three-piece golf ball, and multi-piece golf ball. In a preferable embodiment, the golf ball according to the present invention comprises a spherical core and at least one cover layer covering the spherical core, wherein the spherical core is the constituent member formed from the above-described rubber composition.

[Spherical Core]

The spherical core preferably has a diameter of 34.8 mm or more, more preferably 36.8 mm or more, and even more preferably 38.8 mm or more, and preferably has a diameter of 42.2 mm or less, more preferably 41.8 mm or less, even more preferably 41.2 mm or less, and most preferably 40.8 mm or less. If the spherical core has a diameter of 34.8 mm or more, the thickness of the cover does not become too thick and thus the rebound resilience becomes better. On the other hand, if the spherical core has a diameter of 42.2 mm or less, the thickness of the cover does not become too thin and thus the cover functions better.

When the spherical core has a diameter in a range from 34.8 mm to 42.2 mm, the compression deformation amount of the spherical core (shrinking amount of the spherical core along the compression direction) when applying a load from 98 N as an initial load to 1275 N as a final load to the spherical core is preferably 2.6 mm or more, more preferably 2.8 mm or more, and even more preferably 3.0 mm or more, and is preferably 5.4 mm or less, more preferably 5.2 mm or less, and even more preferably 5.0 mm or less. If the compression deformation amount is 2.6 mm or more, the shot feeling becomes better, and if the compression deformation amount is 5.4 mm or less, the rebound resilience becomes better.

The center hardness Ho of the spherical core is preferably 50 or more, more preferably 53 or more, and even more preferably 55 or more in Shore C hardness. If the center hardness Ho of the spherical core is less than 50 in Shore C hardness, the spherical core becomes so soft that the rebound resilience thereof may be lowered. In addition, the center hardness Ho of the spherical core is preferably 70 or less, more preferably 68 or less, and even more preferably 65 or less in Shore C hardness. If the center hardness Ho exceeds 70 in Shore C hardness, the spherical core becomes so hard that the shot feeling thereof may be lowered.

The surface hardness Hs of the spherical core is preferably 70 or more, more preferably 72 or more, and even more preferably 74 or more, and is preferably 90 or less, and more preferably 88 or less in Shore C hardness. If the surface hardness of the spherical core is 70 or more in Shore C hardness, the spherical core does not become excessively soft, and thus a better rebound resilience is obtained. In addition, if the surface hardness of the spherical core is 90 or less in Shore C hardness, the spherical core does not become excessively hard, and thus a better shot feeling is obtained.

[Cover]

The cover of the golf ball according to the present invention is formed from a cover composition containing a resin component. Examples of the resin component include, for example, an ionomer resin; a thermoplastic polyurethane elastomer having a commercial name of "Elastollan (registered trademark)" commercially available from BASF Japan Ltd; a thermoplastic polyamide elastomer having a commercial name of "Pebax (registered trademark)" commercially available from Arkema K. K.; a thermoplastic polyester elastomer having a commercial name of "Hytrel (registered trademark)" commercially available from Du Pont-Toray Co., Ltd.; and a thermoplastic styrene elastomer having a commercial name of "Rabalon (registered trademark)" commercially available from Mitsubishi Chemical Corporation; and the like.

Examples of the ionomer resin include a product prepared by neutralizing at least a part of carboxyl groups in a binary copolymer composed of an olefin and an $\alpha,\beta$-unsaturated carboxylic acid having 3 to 8 carbon atoms with a metal ion, a product prepared by neutralizing at least a part of carboxyl groups in a ternary copolymer composed of an olefin, an $\alpha,\beta$-unsaturated carboxylic acid having 3 to 8 carbon atoms and an $\alpha,\beta$-unsaturated carboxylic acid ester with a metal ion, or a mixture of those. The olefin is preferably an olefin having 2 to 8 carbon atoms. Examples of the olefin include ethylene, propylene, butene, pentene, hexene, heptene, and octene. In particular, the olefin is preferably ethylene. Examples of the $\alpha,\beta$-unsaturated carboxylic acid having 3 to 8 carbon atoms include acrylic acid, methacrylic acid, fumaric acid, maleic acid and crotonic acid. Among these, acrylic acid and methacrylic acid are particularly preferred. Examples of the $\alpha,\beta$-unsaturated carboxylic acid ester include methyl ester, ethyl ester, propyl ester, n-butyl ester, isobutyl ester of acrylic acid, methacrylic acid, fumaric acid, maleic acid or the like. In particular, acrylic acid ester and methacrylic acid ester are preferable. Among these, the ionomer resin is preferably a metal ion-neutralized product of a binary copolymer composed of ethylene-(meth)acrylic acid and a metal ion-neutralized product of a ternary copolymer composed of ethylene-(meth)acrylic acid-(meth)acrylic acid ester.

Specific examples of the ionomer resin include trade name "Himilan (registered trademark) (e.g. the binary copolymerized ionomer such as Himilan 1555 (Na), Himilan 1557 (Zn), Himilan 1605 (Na), Himilan 1706 (Zn), Himilan 1707 (Na), Himilan AM3711 (Mg); and the ternary copolymerized ionomer such as Himilan 1856 (Na), Himilan 1855 (Zn))" commercially available from Du Pont-Mitsui Polychemicals Co., Ltd.

Further, examples of the ionomer resin also include "Surlyn (registered trademark) (e.g. the binary copolymerized ionomer such as Surlyn 8945 (Na), Surlyn 9945 (Zn), Surlyn 8140 (Na), Surlyn 8150 (Na), Surlyn 9120 (Zn), Surlyn 9150 (Zn), Surlyn 6910 (Mg), Surlyn 6120 (Mg), Surlyn 7930 (Li), Surlyn 7940 (Li), Surlyn AD8546 (Li); and the ternary copolymerized ionomer such as Surlyn 8120 (Na), Surlyn 8320 (Na), Surlyn 9320 (Zn), Surlyn 6320 (Mg), HPF 1000 (Mg), HPF 2000 (Mg))" commercially available from E.I. du Pont de Nemours and Company.

Further, examples of the ionomer resin also include "Iotek (registered trademark) (e.g. the binary copolymerized ionomer such as Iotek 8000 (Na), Iotek 8030 (Na), Iotek 7010 (Zn), Iotek 7030 (Zn); and the ternary copolymerized ionomer such as Iotek 7510 (Zn), Iotek 7520 (Zn))" commercially available from ExxonMobil Chemical Corporation.

It is noted that Na, Zn, Li, and Mg described in the parentheses after the trade names of the above-described ionomer resins indicate metal ion types for neutralizing the ionomer resins. The ionomer resin may be used solely or as a mixture of at least two of them.

The cover composition constituting the cover of the golf ball according to the present invention preferably contains a thermoplastic polyurethane elastomer or an ionomer resin as a resin component. In case of using the ionomer resin, it is also preferred to use a thermoplastic styrene elastomer together. The amount of the polyurethane or ionomer resin in the resin component of the cover composition is preferably 50 mass % or more, more preferably 60 mass % or more, and even more preferably 70 mass % or more.

In addition to the above-described resin component, the cover composition may further contain a pigment component such as a white pigment (for example, titanium oxide), a blue pigment, and a red pigment; a weight adjusting agent such as zinc oxide, calcium carbonate, and barium sulfate; a dispersant; an antioxidant; an ultraviolet absorber; a light stabilizer; a fluorescent material or a fluorescent brightener; and the like, as long as they do not impair the performance of the cover.

The amount of the white pigment (for example, titanium oxide) is preferably 0.5 part by mass or more, more preferably 1 part by mass or more, and is preferably 10 parts by mass or less, more preferably 8 parts by mass or less, with respect to 100 parts by mass of the resin component constituting the cover. If the amount of the white pigment is 0.5 part by mass or more, it is possible to impart the opacity to the cover. Further, if the amount of the white pigment is more than 10 parts by mass, the durability of the resultant cover may deteriorate.

The slab hardness of the cover composition is preferably set in accordance with the desired performance of the golf ball. For example, in case of a so-called distance golf ball which focuses on a flight distance, the cover composition preferably has a slab hardness of 50 or more, more preferably 55 or more, and even more preferably 60 or more, and preferably has a slab hardness of 80 or less, more preferably 70 or less, and even more preferably 68 or less in shore D hardness. If the cover composition has the slab hardness of 50 or more, the obtained golf ball has a high launch angle and low spin rate on driver shots and iron shots, and thus travels a greater flight distance. If the cover composition has the slab hardness of 80 or less, the golf ball excellent in durability is obtained. Further, in case of a so-called spin golf ball which focuses on controllability, the cover composition preferably has a slab hardness of less than 50, and preferably has a slab hardness of 20 or more, more preferably 25 or more and even more preferably 30 or more in shore D hardness. If the cover composition has the slab hardness of less than 50 in shore D hardness, the flight distance on driver shots can be improved by the core of the present invention, as well as the obtained golf ball readily stops on the green due to the high spin rate on approach shots. If the cover composition has the slab hardness of 20 or more, the abrasion resistance is enhanced. In case of a plurality of cover layers, the slab hardness of the cover composition constituting each layer can be identical to or different from each other, as long as the slab hardness of each layer is within the above range.

The method for molding the cover of the golf ball according to the present invention includes, for example, a method which comprises molding the cover composition into a hollow shell, covering the core with a plurality of the hollow shells, and subjecting the core with a plurality of the hollow shells to a compression molding (preferably a method which comprises molding the cover composition into a hollow half-shell, covering the core with two of the hollow half-shells, and subjecting the core with two of the hollow half-shells to a compression molding), and a method which comprises injection molding the cover composition directly onto the core.

When molding the cover in a compression molding method, molding of the half shell can be performed by either a compression molding method or an injection molding method, but the compression molding method is preferred. The compression molding of the cover composition into the half shell can be carried out, for example, under a pressure of 1 MPa or more and 20 MPa or less at a molding temperature of −20° C. or more and 70° C. or less relative to the flow beginning temperature of the cover composition. By performing the molding under the above conditions, a half shell having a uniform thickness can be formed. Examples of the method for molding the cover using the half shell include a method of covering the core with two of the half shells and then subjecting the core with two of the half shells to the compression molding. The compression molding of the half shell into the cover can be carried out, for example, under a molding pressure of 0.5 MPa or more and 25 MPa or less at a molding temperature of −20° C. or more and 70° C. or less relative to the flow beginning temperature of the cover composition. By performing the molding under the above conditions, a golf ball cover having a uniform thickness can be formed.

In case of injection molding the cover composition into the cover, the cover composition extruded into a pellet form may be used for the injection molding, or the cover materials such as the base resin component and the pigment may be dry blended, followed by directly injection molding the blended material. It is preferred to use upper and lower molds having a spherical cavity and pimples for forming the cover, wherein a part of the pimples also serves as a retractable hold pin. When molding the cover by the injection molding, the hold pin is protruded to hold the core, and the cover composition is charged and then cooled to obtain a cover. For example, it is preferred that the cover composition heated to 200° C. to 250° C. is charged into a mold held under a pressure of 9 MPa to 15 MPa for 0.5 second to 5 seconds, and after cooled for 10 to 60 seconds, the mold is opened to obtain a golf ball.

The concave portions called "dimples" are usually formed on the surface of the cover when the cover is molded. The total number of the dimples formed on the cover is preferably 200 or more and 500 or less. If the total number of the dimples is less than 200, the dimple effect is hardly obtained, and if the total number of the dimples exceeds 500, the dimple effect is hardly obtained because the size of the respective dimples is small. The shape (shape in a plane view) of the dimple formed on the cover includes, for example, without any limitation, a circle, a polygonal shape such as a roughly triangular shape, a roughly quadrangular shape, a roughly pentagonal shape, a roughly hexagonal shape, and other irregular shape. The shape of the dimples may be employed solely or at least two of them may be employed in combination.

The thickness of the cover is preferably 4.0 mm or less, more preferably 3.0 mm or less, and even more preferably 2.0 mm or less. If the thickness of the cover is 4.0 mm or less, the rebound resilience and shot feeling of the obtained golf ball becomes better. The thickness of the cover is preferably 0.3 mm or more, more preferably 0.5 mm or more, even more preferably 0.8 mm or more, and most preferably 1.0 mm or more. If the thickness of the cover is less than 0.3 mm, the durability and abrasion resistance of the cover may be lowered. In case of a plurality of cover layers, the total thickness of a plurality of cover layers is preferably within the above range.

The golf ball body on which the cover has been formed is ejected from the mold, and is preferably subjected to surface treatments such as deburring, cleaning, and sandblast as necessary. If desired, a paint film or a mark may be formed. The paint film preferably has a thickness of, but not particularly limited to, 5 µm or larger, and more preferably 7 µm or larger, and preferably has a thickness of 50 µm or smaller, more preferably 40 µm or smaller, and even more preferably 30 µm or smaller. If the thickness is smaller than 5 µm, the paint film is easy to wear off due to continued use of the golf ball, and if the thickness is larger than 50 µm, the dimple effect is reduced, resulting in lowering flying performance of the golf ball.

[Golf Ball]

Figure 2:
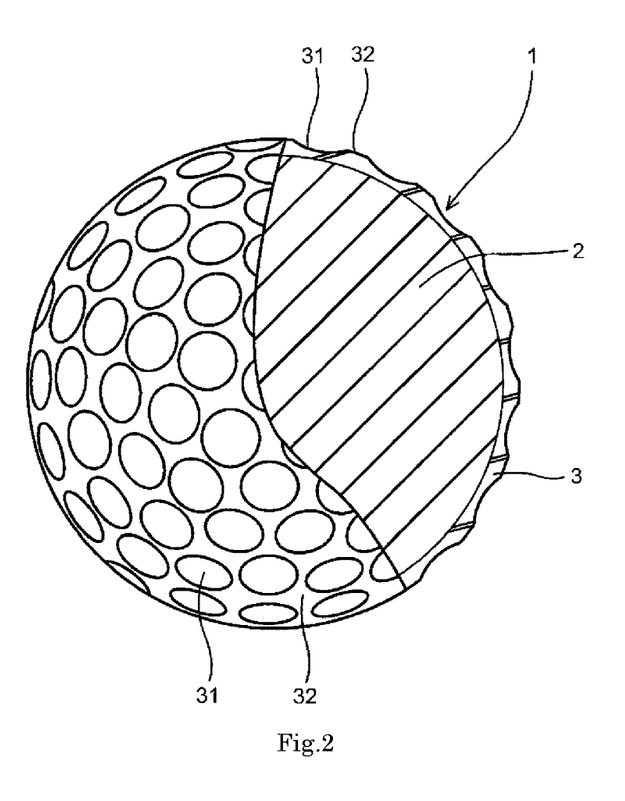
FIG. 2 is a partially cutaway sectional view showing a golf ball according to an embodiment of the present invention.

The construction of the golf ball according to the present invention is not particularly limited, as long as it comprises a spherical core and at least one cover layer covering the spherical core. FIG. 2 is a partially cutaway sectional view showing a golf ball 1 according to an embodiment of the present invention. The golf ball 1 comprises a spherical core 2, and a cover 3 covering the spherical core 2. A plurality of dimples 31 are formed on the surface of the cover 3. Other portion than the dimples 31 on the surface of the golf ball 1 is a land 32. The golf ball 1 is provided with a paint layer and a mark layer on the exterior side of the cover 3, but these layers are not shown in this figure.

The spherical core preferably has a single layered construction. Unlike a multi-layered construction, the spherical core having the single layered construction does not have an energy loss at the interface of the multi-layered construction when being hit, and thus has an improved rebound resilience. The cover has a construction composed of at least one layer, for example, the cover may have a single layered construction or a multi-layered construction composed of at least two layers. The golf ball according to the present invention includes, for example, a two-piece golf ball composed of a spherical core and a single layered cover disposed around the spherical core; a multi-piece golf ball (including a three-piece golf ball) composed of a spherical core and at least two cover layers disposed around the spherical core; and a wound golf ball composed of a spherical core, a rubber thread layer formed around the spherical core, and a cover disposed around the rubber thread layer. The present invention can be suitably applied to any one of the above golf balls.

The golf ball according to the present invention preferably has a diameter ranging from 40 mm to 45 mm. In light of satisfying a regulation of US Golf Association (USGA), the diameter is particularly preferably 42.67 mm or more. In light of prevention of air resistance, the diameter is more preferably 44 mm or less, and particularly preferably 42.80 mm or less. In addition, the golf ball according to the present invention preferably has a mass of 40 g or more and 50 g or less. In light of obtaining greater inertia, the mass is more preferably 44 g or more, and particularly preferably 45.00 g or more. In light of satisfying a regulation of USGA, the mass is particularly preferably 45.93 g or less.

When the golf ball according to the present invention has a diameter in a range from 40 mm to 45 mm, the compression deformation amount of the golf ball (shrinking amount of the golf ball along the compression direction) when applying a load from 98 N as an initial load to 1275 N as a final load to the golf ball is preferably 2.60 mm or more, more preferably 2.80 mm or more, and even more preferably 3.00 mm or more, and is preferably 5.40 mm or less, more preferably 5.20 mm or less, and even more preferably 5.00 mm or less. If the compression deformation amount is 2.60 mm or more, the golf ball does not become excessively hard, and thus the shot feeling thereof becomes better. On the other hand, if the compression deformation amount is 5.40 mm or less, the rebound resilience of the golf ball becomes higher.

EXAMPLES

Next, the present invention will be described in detail by way of examples. However, the present invention is not limited to the examples described below. Various changes and modifications without departing from the spirit of the present invention are included in the scope of the present invention.
[Evaluation Methods]
(1) Compression Deformation Amount A compression deformation amount of the core or golf ball along the compression direction (shrinking amount of the core or golf ball along the compression direction), when applying a load from an initial load of 98 N to a final load of 1275 N to the core or golf ball, was measured.
(2) Core Hardness Distribution (Shore C Hardness)

A hardness measured on the surface of the core was adopted as the surface hardness of the core. In addition, a hardness measured at the central point of a cut plane that was obtained by cutting the core into two hemispheres, was adopted as the center hardness of the core. The hardness was measured with an automatic hardness tester (Digitest II, available from Bareiss company) using a testing device of "Shore C".

(3) Coefficient of Restitution

A metal cylindrical object with a mass of 198.4 g was allowed to collide with each golf ball at a speed of 40 m/sec, and the speeds of the cylindrical object and the golf ball before and after the collision were measured. Based on these speeds and the mass of each object, coefficient of restitution of each golf ball was calculated. It is noted that the measurement was conducted using twelve samples for each golf ball, and the average value thereof was adopted as the coefficient of restitution of the golf ball. In Tables 1 to 2, the coefficient of restitution of the golf ball is shown as a difference from that of the golf ball No. 17.
(4) Slab Hardness (Shore D Hardness)

Sheets with a thickness of about 2 mm were prepared by injection molding the cover composition. The sheets were stored at 23° C. for two weeks. At least three of these sheets were stacked on one another so as not to be affected by the measuring substrate on which the sheets were placed, and the hardness of the stack was measured with an automatic hardness tester (Digitest II, available from Bareiss company) using a testing device of "Shore D".
(5) Durability A W#1 driver provided with a metal head (XXIO S, loft angle: 11°, available from Dunlop Sports Limited) was installed on a swing robot M/C available from Golf Laboratories, Inc. The golf ball was hit repeatedly at a head speed of 45 m/sec until a crack occurred, and the hitting number when the crack occurred was counted. It is noted that the measurement was conducted using twelve samples for each golf ball, and the average value thereof was adopted as the hitting number of the golf ball. The hitting number of the golf ball No. 17 was defined as 100, and the durability of each golf ball was represented by converting the hitting number of each golf ball into this index.
(6) Shot Feeling An actual hitting test was carried out by ten amateur golfers (high skilled persons) using a driver. Feeling at the shot was evaluated by each golfer based on the following standard. Major result of the evaluations of ten golfers was employed as the shot feeling of the golf ball.
Evaluation Standard:
E (excellent): The ball is very soft and the shot feeling is very good.
G (good): The ball is soft and the shot feeling is good.
F (fair): The ball is slightly hard but the shot feeling is acceptable.
P (poor): The ball is hard and the shot feeling is poor.
[Production of Golf Ball]
(1) Production of Core The rubber compositions having the formulations shown in Tables 1-2 were kneaded with a kneading roll, and heat pressed in upper and lower molds, each having a hemispherical cavity, at 170° C. for 20 minutes to obtain spherical cores with a diameter of 39.8 mm.

TABLE 1

|  |  | Golf ball No. | | | | | | | | |
|---|---|---|---|---|---|---|---|---|---|---|
|  |  | 1 | 2 | 3 | 4 | 5 | 6 | 7 | 8 | 9 |
| Core rubber composition | BR730 | 100 | 100 | 100 | 100 | 100 | 100 | 100 | 100 | 100 |
|  | SH3400P (modified with hydroxyl group) | 5 | 10 | 10 | 20 | 30 | 40 | — | — | — |
|  | SM3400C (modified with methacrylic group) | — | — | — | — | — | — | 5 | 10 | 20 |
|  | SA3400C (modified with acrylic group) | — | — | — | — | — | — | — | — | — |
|  | Sanceler SR | 27 | 29 | 39 | 33 | 33 | 33 | 27 | 29 | 33 |
|  | Zinc oxide | 12 | 12 | 12 | 12 | 12 | 12 | 12 | 12 | 12 |
|  | Dicumyl peroxide | 0.8 | 0.8 | 0.8 | 0.8 | 1.6 | 1.6 | 0.8 | 0.8 | 0.8 |
|  | PBDS | 0.3 | 0.3 | 0.3 | 0.3 | 0.3 | 0.3 | 0.3 | 0.3 | 0.3 |
|  | Barium sulfate | 4.99 | 4.99 | 4.99 | 4.99 | 4.99 | 4.99 | 4.98 | 4.98 | 4.98 |

TABLE 1-continued

|  |  | Golf ball No. | | | | | | | | |
|---|---|---|---|---|---|---|---|---|---|---|
|  |  | 1 | 2 | 3 | 4 | 5 | 6 | 7 | 8 | 9 |
| Core properties | Center hardness (Shore C) | 57.5 | 57.8 | 62.5 | 57.7 | 57.6 | 56.3 | 58.0 | 57.9 | 57.8 |
|  | Surface hardness (Shore C) | 79.4 | 79.8 | 88.2 | 79.6 | 79.5 | 77.1 | 80.2 | 80.1 | 79.9 |
|  | Compression deformation amount (mm) | 3.80 | 3.75 | 2.78 | 3.77 | 3.78 | 4.06 | 3.70 | 3.72 | 3.74 |
| Ball properties | Compression deformation amount (mm) | 3.50 | 3.45 | 2.48 | 3.47 | 3.48 | 3.76 | 3.40 | 3.42 | 3.44 |
|  | Coefficient of restitution | −0.002 | −0.004 | 0.015 | −0.009 | −0.018 | −0.035 | −0.001 | −0.003 | −0.006 |
|  | Durability | 105 | 130 | 160 | 130 | 132 | 135 | 135 | 150 | 155 |
|  | Shot feeling | G | G | F | G | G | E | G | G | G |

TABLE 2

|  |  | Golf ball No. | | | | | | | | |
|---|---|---|---|---|---|---|---|---|---|---|
|  |  | 10 | 11 | 12 | 13 | 14 | 15 | 16 | 17 | 18 |
| Core rubber composition | BR730 | 100 | 100 | 100 | 100 | 100 | 100 | 100 | 100 | 100 |
|  | SH3400P (modified with hydroxyl group) | — | — | — | — | — | — | — | — | — |
|  | SM3400C (modified with methacrylic group) | 30 | 40 | — | — | — | — | — | — | — |
|  | SA3400C (modified with acrylic group) | — | — | 5 | 10 | 20 | 30 | 40 | — | — |
|  | Sanceler SR | 33 | 33 | 27 | 29 | 33 | 33 | 33 | 25 | 35 |
|  | Zinc oxide | 12 | 12 | 12 | 12 | 12 | 12 | 12 | 12 | 12 |
|  | Dicumyl peroxide | 1.6 | 1.6 | 0.8 | 0.8 | 0.8 | 1.6 | 1.6 | 0.8 | 0.8 |
|  | PBDS | 0.3 | 0.3 | 0.3 | 0.3 | 0.3 | 0.3 | 0.3 | 0.3 | 0.3 |
|  | Barium sulfate | 4.98 | 4.98 | 4.98 | 4.99 | 4.98 | 4.98 | 4.98 | 4.71 | 4.71 |
| Core properties | Center hardness (Shore C) | 57.6 | 56.3 | 57.6 | 57.5 | 57.8 | 57.6 | 56.0 | 57.5 | 62.6 |
|  | Surface hardness (Shore C) | 79.5 | 77.2 | 79.5 | 79.3 | 79.9 | 79.5 | 76.7 | 79.4 | 88.5 |
|  | Compression deformation amount (mm) | 3.78 | 4.05 | 3.78 | 3.81 | 3.74 | 3.79 | 4.11 | 3.80 | 2.75 |
| Ball properties | Compression deformation amount (mm) | 3.48 | 3.75 | 3.48 | 3.51 | 3.44 | 3.49 | 3.81 | 3.50 | 2.45 |
|  | Coefficient of restitution | −0.015 | −0.023 | −0.001 | −0.003 | −0.005 | −0.016 | −0.026 | 0.000 | 0.015 |
|  | Durability | 160 | 160 | 135 | 150 | 155 | 160 | 160 | 100 | 150 |
|  | Shot feeling | G | E | G | G | G | G | E | G | P |

The materials used in Tables 1-2 are shown below.

BR730: high cis-polybutadiene rubber (cis-1,4 bond amount=95 mass %, 1,2-vinyl bond amount=1.3 mass %, Moony viscosity ($ML_{1+4}$ (100° C.)=55, molecular weight distribution (Mw/Mn)=3) available from JSR Corporation SH3400P: polyrotaxane modified with caprolactone available from Advanced Softmaterials Inc.

SM3400C: polyrotaxane modified with caprolactone (terminal of caprolactone chain is modified with methacrylic group) available from Advanced Softmaterials Inc.

SA3400C: polyrotaxane modified with caprolactone (terminal of caprolactone chain is modified with acrylic group) available from Advanced Softmaterials Inc.

Sanceler SR: zinc acrylate (product of 10 mass % stearic acid coating) available from Sanshin Chemical Industry Co., Ltd.

Zinc oxide: White Seal available from PT. INDO LYSAGHT

Dicumyl peroxide: available from Tokyo Chemical Industry Co., Ltd.

PBDS: bis(pentabromophenyl) disulfide available from Kawaguchi Chemical Industry Co., Ltd.

Barium sulfate: "Barium sulfate BD" available from Sakai Chemical Industry Co., Ltd.

(2) Production of Cover and Production of Golf Ball

The cover materials having the formulation shown in Table 3 were extruded with a twin-screw kneading extruder to prepare the cover composition in a pellet form. The extruding conditions of the cover composition were a screw diameter of 45 mm, a screw rotational speed of 200 rpm, and screw L/D=35, and the mixtures were heated to 160 to 230° C. at the die position of the extruder. The obtained cover composition was injection molded onto the spherical cores obtained above to produce the golf balls comprising a spherical core and a cover covering the spherical core. The obtained golf balls were evaluated and the evaluation results are shown in Tables 1-2.

TABLE 3

| Cover composition | Parts by mass |
|---|---|
| Himilan 1555 | 47 |
| Himilan 1557 | 46 |
| Rabalon T3221C | 7 |
| Titanium oxide | 4 |
| Shore D hardness | 57 |
| Thickness (mm) | 1.45 |

The materials used in Table 3 are shown below.

Himilan 1555: sodium ion neutralized ethylene-methacrylic acid copolymer ionomer resin available from Du Pont-Mitsui Polychemicals Co., Ltd.

Himilan 1557: zinc ion neutralized ethylene-methacrylic acid copolymer ionomer resin available from Du Pont-Mitsui Polychemicals Co., Ltd.

Rabalon T3221C: thermoplastic styrene elastomer available from Mitsubishi Chemical Corporation Titanium oxide: A220 available from Ishihara Sangyo Kaisha, Ltd.

As shown in Tables 1-2, the following golf ball has excellent durability without substantially lowering a shot feeling: a golf ball comprising a constituent member containing a crosslinked rubber component and a polyrotaxane component, wherein the polyrotaxane has a cyclodextrin, a linear molecule piercing through the cyclic structure of the cyclodextrin, and blocking groups located at both terminals of the linear molecule to prevent disassociation of the cyclodextrin, and at least a part of hydroxyl groups of the cyclodextrin is modified with a caprolactone chain via —O—$C_3H_6$—O— group.

The golf ball according to the present invention has excellent durability without substantially lowering a shot feeling. This application is based on Japanese patent application No. 2016-193886, filed on Sep. 30, 2016, the content of which is hereby incorporated by reference.

The invention claimed is:

1. A golf ball comprising a constituent member containing a crosslinked rubber component and a polyrotaxane component, wherein the polyrotaxane has a cyclodextrin, a linear molecule piercing through the cyclic structure of the cyclodextrin, and blocking groups located at both terminals of the linear molecule to prevent disassociation of the cyclodextrin, and at least a part of hydroxyl groups of the cyclodextrin is modified with a caprolactone chain via —O—$C_3H_6$—O— group.

2. The golf ball according to claim 1, wherein the linear molecule is polyethylene glycol, and the blocking group is an adamantyl group.

3. The golf ball according to claim 1, wherein a terminal of the caprolactone chain is modified with an acrylic group or a methacrylic group.

4. The golf ball according to claim 1, wherein the constituent member is formed from a rubber composition containing (a) a base rubber, (b) an α,β-unsaturated carboxylic acid having 3 to 8 carbon atoms and/or a metal salt thereof as a co-crosslinking agent, (c) a crosslinking initiator, and (d) the polyrotaxane.

5. The golf ball according to claim 4, wherein the rubber composition contains (d) the polyrotaxane in an amount ranging from 1 part by mass to 30 parts by mass with respect to 100 parts by mass of (a) the base rubber.

6. The golf ball according to claim 4, wherein (a) the base rubber is a high cis-polybutadiene having a cis-1,4 bond in a proportion of 95 mass % or more, a molecular weight distribution of 3.0 or less, and a Mooney viscosity ($ML_{1+4}$ (100° C.)) of 55 or less.

7. The golf ball according to claim 1, where the golf ball comprises a spherical core and one or more cover layer, and the spherical core is the constituent member.

8. The golf ball according to claim 1, wherein the golf ball has a diameter in a range from 40 mm to 45 mm, and a compression deformation amount (a shrinking amount along the compression direction) in a range from 2.60 mm to 5.40 mm when applying a load from an initial load of 98 N to a final load of 1275 N to the golf ball.

9. The golf ball according to claim 3, wherein the polyrotaxane has a double bond in an amount ranging from 0.65 mmol/g to 2.0 mmol/g.

10. The golf ball according to claim 1, wherein the linear molecule has a weight average molecular weight ranging from 5,000 to 100,000.

11. The golf ball according to claim 1, wherein the polyrotaxane has a hydroxyl value ranging from 10 mgKOH/g to 400 mgKOH/g.

12. The golf ball according to claim 1, wherein the polyrotaxane has a total molecular weight ranging from 30,000 to 3,000,000 in a weight average molecular weight.

13. The golf ball according to claim 4, wherein the rubber composition further contains (g) an organic sulfur compound.

14. The golf ball according to claim 7, wherein the spherical core has a center hardness Ho ranging from 50 to 70 in Shore C hardness.

15. The golf ball according to claim 7, wherein the spherical core has a surface hardness Hs ranging from 70 to 90 in Shore C hardness.

* * * * *